United States Patent
Davidsson et al.

(10) Patent No.: US 9,618,345 B2
(45) Date of Patent: Apr. 11, 2017

(54) METHOD AND SYSTEM FOR IDENTIFYING A SITUATION WITH A POTENTIALLY IN-ALERT DRIVER

(71) Applicant: VOLVO CAR CORPORATION, Gothenburg (SE)

(72) Inventors: Staffan Davidsson, Vastra Frolunda (SE); Johan Maresch, Gothenburg (SE)

(73) Assignee: VOLVO CAR CORPORATION (SE)

(*) Notice: Subject to any disclaimer, the term of this patent is extended or adjusted under 35 U.S.C. 154(b) by 0 days.

(21) Appl. No.: 14/862,301

(22) Filed: Sep. 23, 2015

(65) Prior Publication Data
US 2016/0097645 A1 Apr. 7, 2016

(30) Foreign Application Priority Data
Oct. 3, 2014 (EP) ...................................... 14187622

(51) Int. Cl.
*G01C 21/26* (2006.01)
*B60W 40/072* (2012.01)
(Continued)

(52) U.S. Cl.
CPC ......... *G01C 21/26* (2013.01); *G01C 21/3697* (2013.01); *G08B 21/06* (2013.01); *G08B 31/00* (2013.01)

(58) Field of Classification Search
CPC G01C 21/26; G01C 21/3461; G01C 21/3492; B60K 28/066; B60K 35/00;
(Continued)

(56) References Cited

U.S. PATENT DOCUMENTS

2008/0004797 A1* 1/2008 Katzer ............... G01C 21/3461
701/533
2008/0291032 A1* 11/2008 Prokhorov ........... B60K 28/066
340/576

(Continued)

FOREIGN PATENT DOCUMENTS

EP 1291226 A2 3/2003

OTHER PUBLICATIONS

Extended European Search Report Dated Mar. 16, 3015, Application No. 14187622.7-1557—Applicant Volvo Car Corporation, 9 Pages.

*Primary Examiner* — Yuri Kan
(74) *Attorney, Agent, or Firm* — Brooks Kushman P.C.

(57) ABSTRACT

The present disclosure relates to a method performed by a road segment determining system for identifying beforehand a situation with a potentially in-alert driver of a vehicle. The road segment determining system determines a position of the vehicle, and further determines pre-stored road characteristics of a road segment assumed or known to be ahead of the vehicle. Moreover, the road segment determining system determines the road segment to be monotonous based on comparing at least a first road parameter of the pre-stored road characteristics with predetermined monotonous road criteria. The disclosure also relates to a road segment determining system in accordance with the foregoing, a vehicle comprising at least a portion of the road segment determining system, and a user device comprising at least a portion of the road segment determining system.

19 Claims, 4 Drawing Sheets

(51) Int. Cl.
*G01C 21/36* (2006.01)
*G08B 21/06* (2006.01)
*G08B 31/00* (2006.01)

(58) Field of Classification Search
CPC .............. B60W 40/072; G05D 1/0212; G06Q 30/0224; G08B 21/06; B62K 28/06
USPC ......... 701/36, 409, 208; 340/576; 707/104.1
See application file for complete search history.

(56) References Cited

U.S. PATENT DOCUMENTS

| | | | | |
|---|---|---|---|---|
| 2009/0231146 | A1* | 9/2009 | Fujita | G01C 21/3461 340/576 |
| 2009/0268022 | A1* | 10/2009 | Omi | G08B 21/06 348/135 |
| 2009/0300067 | A1* | 12/2009 | Denaro | B60W 40/072 |
| 2011/0224898 | A1* | 9/2011 | Scofield | G01C 21/3492 701/532 |
| 2013/0194099 | A1* | 8/2013 | Nagata | B60K 28/06 340/575 |
| 2015/0175003 | A1* | 6/2015 | Chao | B60K 35/00 701/1 |
| 2015/0300825 | A1* | 10/2015 | Manoliu | G05D 1/0212 701/36 |
| 2016/0171521 | A1* | 6/2016 | Ramirez | G06Q 30/0224 701/409 |

\* cited by examiner

METHOD AND SYSTEM FOR IDENTIFYING A SITUATION WITH A POTENTIALLY IN-ALERT DRIVER

CROSS-REFERENCE TO RELATED APPLICATIONS

This application claims foreign priority benefits under 35 U.S.C. §119(a)-(d) to European patent application number EP 14187622.7, filed Oct. 3, 2014, which is incorporated by reference in its entirety.

TECHNICAL FIELD

The present disclosure relates to a road segment determining system and a method performed therein for identifying beforehand a situation with a potentially in-alert driver of a vehicle.

BACKGROUND

Because of a need or desire to reach a given destination at a given time, it is not uncommon that vehicle drivers spend more time at the wheel than is reasonably prudent and safe, or spend time driving fatigued long past when they should be asleep. Accordingly, it is not surprising that vehicle accidents occur where the driver has dozed off at the wheel and where the vehicle has veered off the road. Accidents result not only in vehicle damage, property damage and severe injury of the driver; they can also result in the injury of other drivers or pedestrians in the area of the accident.

Research has shown that vehicle drivers may, to greater extent, become drowsy, in-alert or bored during driving in monotonous routes. In addition to the hazardous risks discussed above associated with a vehicle driver being fatigued or even dozing off at the wheel, it is furthermore common that a vehicle driver counteracts the monotony by potentially hazardous distractions, such as for instance by increasing speed or by texting messages.

Accordingly, in order to prevent vehicle drivers from being in-alert, dozing off, or from being bored while driving monotonous routes, solutions have been developed which identify monotonous routes.

US 2009/0231146, for instance, relates to a scene monotonousness calculation. It is disclosed how a monotonous calculation device has an image acquisition means for acquiring an exterior appearance image, and a monotonousness calculation means for calculating the monotonousness of a scene corresponding to the exterior appearance image.

However, although the approach of US 2009/0231146 enables a degree of monotony to be calculated very accurately, and accordingly enables a situation with a potentially in-alert driver to be identified, said solution requires utilization of image acquisition means. Moreover, the scene corresponding to the exterior appearance image is restricted to be within fairly close range of the vehicle.

SUMMARY

It is therefore an object of embodiments herein to provide a more efficient approach for identifying beforehand a situation with a potentially in-alert driver of a vehicle.

According to a first aspect of embodiments herein, the object is achieved by a method performed by a road segment determining system for identifying beforehand a situation with a potentially in-alert driver of a vehicle. The road segment determining system determines a position of the vehicle. Furthermore, the road segment determining system determines pre-stored road characteristics of a road segment assumed or known to be ahead of the vehicle. The road segment determining system then determines the road segment to be monotonous based on comparing at least a first road parameter of the pre-stored road characteristics with predetermined monotonous road criteria.

Thereby, by determining that a road segment is considered to be monotonous based on road characteristics which are pre-stored, and since a monotonous road segment may imply a situation with a potentially in-alert driver, a potentially hazardous driver situation may be identified before it may be bound to occur, i.e., prior to the vehicle reaching said road segment. That is, by comparing at least a first road parameter of the pre-stored road characteristics, e.g., at least a road curve radius parameter, with predetermined monotonous road criteria, e.g., a road curve radius preference, the road segment determining system may determine that if the e.g., road curve radius is larger than a predetermined road curve radius threshold, the road segment is considered to be monotonous. Accordingly, by comparing the pre-stored road characteristics with the predetermined monotonous road criteria, it may be determined whether or not said road section assumed or known to be ahead of the vehicle, is considered monotonous, prior to the vehicle approaching or reaching said road segment.

For that reason, a more efficient approach is provided with regards to identifying beforehand a situation with a potentially in-alert driver of a vehicle.

The technical features and corresponding advantages of the above mentioned method will be discussed in further detail in the following.

By introducing a method performed by a road segment determining system for identifying beforehand a situation with a potentially in-alert driver of a vehicle, an approach is provided which enables for awareness, in advance, of a potentially hazardous driving situation. The word "vehicle" may refer to any arbitrary vehicle, such as car, truck, lorry, van, bus, motor cycle, scooter, tractor, or military vehicle. Moreover, the expression "potentially in-alert driver" may refer to the driver being assumed to become, bored, drowsy, dosing, fatigued, sleepy, and/or asleep. "Identifying" may refer to "establishing", "learning of" and/or "determining", whereas "beforehand" may refer to "in advance" and/or "prior to occurrence of".

The road segment determining system may, for instance, at least partly be comprised in the vehicle. Additionally or alternatively, the road segment determining system may, at least partly, be comprised in a user device, which user device may be taken on-board the vehicle. Furthermore, the road segment determining system may be adapted to be in radio communication with a radio communications network, such as cellular communications network, e.g., LTE, EDGE, CDMA, 4G, 3G, GPRS, or GSM, e.g., via the vehicle and/or the user device. The "user device" may in this context be a mobile user device, which mobile user device further may have navigating abilities. The user device may accordingly refer to, for instance, a multi-functional smart phone, mobile phone, mobile terminal or wireless terminal, portable computer such as a laptop, PDA or tablet computer, surf plate such as an iPad, Pocket PC, and/or mobile navigation device. According to an example, the user device may be adapted to communicate with the vehicle. The expression of the user device being adapted to "communicate with the vehicle", may refer to the user device being configured to be in communication with the vehicle, e.g., the in-vehicle system thereof, such that information and/or data may be transferred between the vehicle and the user device. Such communication may for instance be accomplished physically, such as via USB connection, and/or wirelessly, such as via Bluetooth, WiFi, or the like; additionally or alternatively, the connection may be accomplished via an intermediate system adapted to communicate with vehicles, for instance a management and/or assisting system such as e.g., Volvo On Call. Said expression may further refer to the user device being adapted to be "paired" and/or adapted to "be in connection" with the vehicle. The "user device" may in that context be referred to as a "nomadic device". Possibly, in order to be paired, identification of the nomadic device may be necessary, and/or authentication of the vehicle occupant, e.g., the driver. While the nomadic device is paired, the e.g., driver may utilize functionality of the nomadic device via the in-vehicle system.

Since the road segment determining system determines a position of the vehicle, a location of the vehicle is established. Determining the vehicle position, e.g., the vehicle's GPS position, may take place periodically, essentially constantly and/or on request. Moreover, determining the position of the vehicle may be achieved in any commonly known manner, and may for instance refer to GPS positioning, WiFi positioning and/or cellular positioning, e.g., accomplished by means of a navigation system and/or the previously discussed user device on-board the vehicle. The position of the vehicle may thus, according to some embodiments, be represented by the position of the user device. The word "determining" may in this context refer to, for instance, "establishing", "learning of", "becoming aware of", "identifying", "deriving", "retrieving", "receiving", and/or "requesting".

Since the road segment determining system determines pre-stored road characteristics of a road segment assumed or known to be ahead of the vehicle, road characteristics which are associated with an upcoming road segment and which are available prior to the vehicle approaching or reaching said road segment, are accessed. That is, by e.g., accessing pre-stored road characteristics of said road segment, the road segment determining system is made aware of road characteristics parameters describing the road segment assumed or known to be ahead of the vehicle. Thus, by learning of the characteristics of the road segment ahead from road characteristics that are pre-stored, there is no need for the road segment determining system to learn of the characteristics of the road segment ahead visually, for instance, by means of image capturing means, such as a camera.

The word "determining" may in this context refer to, for instance, "accessing", "establishing", "learning of", "becoming aware of", "identifying", "deriving", "retrieving", "receiving", and/or "requesting". Moreover, the expression "road segment assumed or known to be ahead of the vehicle" may refer to any arbitrary upcoming road section or stretch of road, of arbitrary length, along which the vehicle is expected to travel. The road segment may be identified to lie ahead of the vehicle, for instance, by being a road section of a route guided by a navigation system, by being a road section further ahead up a road along which the vehicle is currently travelling, and/or by being a road section along which the vehicle is known, through learned behavior, to commonly travel, etc.

The expression "road characteristics of the road segment" may refer to parameters reflecting characteristics associated with said road segment. The road characteristics being "pre-stored" may refer to the road characteristics being stored prior to the vehicle approaching or reaching the road segment. The road characteristics may be stored in one or more of for instance a memory and/or a database. The memory and/or database may be locally arranged on-board the vehicle, for instance comprised in an in-vehicle system, and/or comprised in the user device discussed above, which user device may be adapted to communicate with the vehicle. Additionally or alternatively, the memory and/or database may be remotely arranged, for instance comprised in one or more servers remotely located from the vehicle. Said memory and/or database may, for instance, be comprised in an intermediate system adapted to communicate with one or more vehicles and/or adapted to hold updated information associated with the one or more vehicles, for instance a management and/or assisting system such as e.g., Volvo On Call.

Since the road segment determining system determines the road segment to be monotonous based on comparing at least a first road parameter of the pre-stored road characteristics, with predetermined monotonous road criteria, the road segment determining system establishes whether said road segment is considered to be monotonous. That is, by comparing at least a first road parameter of the pre-stored road characteristics, e.g., at least a road curve radius parameter, with predetermined monotonous road criteria, e.g., a road curve radius preference, the road segment determining system may determine that if the e.g., road curve radius is larger than a predetermined road curve radius threshold, the road segment is considered to be monotonous. Accordingly, by comparing road characteristics which are pre-stored, with the predetermined monotonous road criteria, it may be determined whether or not said road section assumed or known to be ahead of the vehicle, is considered monotonous, prior to the vehicle approaching or reaching said road section. Consequently, since a monotonous road segment may imply a situation with a potentially in-alert driver, for instance that the alertness of the driver may decrease, a potentially hazardous driver situation may be identified before it may be bound to occur, i.e., prior to the vehicle reaching the road segment.

The expression "predetermined monotonous road criteria" may refer to pre-set and/or pre-stored, possibly adjustable, preferences making up the criteria for under what circumstances a road section is considered to be monotonous. Furthermore, the word "monotonous" may refer to, for instance, "dull", "lacking in variety and interest", "soporific" and/or "non-stimulating", whereas the expression "based on" in this context may refer to, for instance, "taking into account", "considering" and/or "by".

According to an embodiment, the pre-stored road characteristics may be available prior to the vehicle being in the vicinity of the road segment. Thereby, by the road characteristics of a road segment being accessible even before the vehicle is relatively close to said road segment, a monotonous road segment may be identified irrespective of how far away the vehicle is from the road segment. That is, there is no need for the vehicle to be close to the road segment in order to determine whether or not said road segment is considered to be monotonous. Accordingly, a monotonous road section, which may imply a situation with a potentially in-alert driver, may be identified well ahead of time before the vehicle approaches or reaches said road section, whereby, subsequently, appropriate measures may be initiated to counteract said situation with the potentially in-alert driver.

The word "available" may refer to, for instance, "accessible", "receivable", and/or "retrievable", whereas the word "prior to" may refer to, for instance, "before" and/or "in advance of". Moreover, the expression "in the vicinity of" is intended to be interpreted in a broad manner, likewise including for instance "within sight of", "close to", "within a distance from" and/or "within a same region as". Said distance may be represented by for instance 20, 200 or 2,000 meters, whereas said region may refer to for instance an arbitrary shaped and/or sized geographical area.

According to another embodiment, the pre-stored road characteristics may comprise digital map data of the road segment. Thereby, by the road characteristics comprising digital map data, the road segment determining system may determine the road characteristics by accessing said digital map data. The map data may, for instance, be retrievable from the memory and/or database discussed in the foregoing, which memory and/or database in this context may be referred to a map data database. Said map data database may furthermore be comprised in, or associated with, a navigation system. The navigation system may in turn be associated with the vehicle, such as being represented by an in-vehicle navigation system and/or a navigation system comprised in the previously discussed user device which may be located on-board the vehicle and/or which may be adapted to communicate with the vehicle. The navigation system may provide extensive digital map data. Accordingly, the digital map data of the road segment may be derived from the extensive digital map data of said navigation system.

According to a further embodiment, the pre-stored road characteristics may comprise digital map data parameters indicating characteristics of the road segment which potentially affect the alertness of the driver. Thereby, by the road characteristics comprising map data parameters reflecting road segment characteristics assumed or known to affect driver-alertness, parameters considered relevant in terms of potential hazardous driving are utilized to judge whether or not an upcoming road section should be considered to be monotonous. In order to determine whether or not a road segment assumed or known to be ahead of the vehicle, is considered monotonous, one or more digital map data parameters may need to be taken into consideration.

The digital map data parameters indicating characteristics of the road segment which potentially affect the alertness of the driver, may comprise one or more of, for instance, a road curve radius parameter, a road width parameter, a number of lanes parameter, an intersections parameter, a distance between intersections parameter, a number of roads in intersection parameter, a speed limit parameter, a road scenery parameter, a topography parameter, etc.

Correspondingly, the predetermined monotonous road criteria may comprise one or more of, for instance, a road curve radius preference, a road width preference, a number of lanes preference, a preference for intersections, a preference for distance between intersections, a preference for number of roads in intersection, a speed limit preference, a road scenery preference, a topography preference, etc.

Accordingly, by comparing, for instance, a road width parameter with a road width preference, the road segment determining system may determine that if the road width is greater than a road width threshold, the road segment is considered to be monotonous. In a similar manner, by additionally or alternatively comparing, for instance, an intersection parameter with a preference for intersections, the road segment determining system may determine that if there are fewer intersections along the road section than specified by the preference for intersections, the road segment is considered to be monotonous.

Additionally or alternatively, according to an embodiment, the pre-stored road characteristics may comprise geo-tagged driver behavior data of the road segment. Thereby, the road characteristics comprise driver behavior data associated with said road segment, for instance driver alertness along said road segment. That is, driver behavior such as e.g., a high level of in-alertness may for instance be monitored by an in-alertness monitoring system, as known in the art. Said driver behavior, i.e., the e.g., high level of in-alertness, may then be pinned to the geographical position where it occurred, i.e., said event may be geo-tagged. The geo-tagged driver behavior data of the road segment may accordingly comprise data of said e.g., high level of in-alertness, should said geographical position be a position along the road segment in question. Accordingly, by the pre-stored road characteristics comprising geo-tagged driver behavior data of a road segment, previous driver behavior associated with the road segment, may be taken into account to judge whether or not the upcoming road segment should be considered to be monotonous.

The geo-tagged driver behavior data may, for instance, be provided from the memory and/or database discussed in the foregoing, which in this context may be referred to as a geo-tagged driver behavior data database. The geo-tagged driver behavior data database may for instance be comprised in, or associated with, the intermediate system discussed above.

Additionally or alternatively, according to a further embodiment, the pre-stored road characteristics may comprise geo-tagged driver behavior data parameters indicating characteristics of driver behavior associated with the road segment, for a plurality of vehicles having previously been driven along the road segment. Thereby, by the road characteristics comprising data parameters reflecting earlier driver behavior characteristics associated with said road segment for a plurality of vehicles, data parameters revealing numerous previous driving experiences along the road segment may be taken into consideration in judging whether or not an upcoming road section should be considered to be monotonous. For instance, should numerous vehicle drivers experience e.g., a high level of in-alertness at essentially the same geographical position or stretch of road, then said geographical position or stretch of road may be considered a "hot spot", where there appears to be a high risk of driver in-alertness.

The input to the geo-tagged driver behavior data parameters of the plurality of vehicles may, for instance, be reported and/or collected from the plurality of vehicles by means of the intermediate system discussed above, and/or by cloud functionality. Said input may furthermore be stored, and e.g., refined, in the geo-tagged driver behavior data database discussed above. The geo-tagged driver behavior data parameters may, for instance, be fetched by, or pushed to, the current vehicle periodically, essentially constantly and/or on request. Additionally or alternatively, the geo-tagged driver behavior data parameters may be provided to the vehicle should the vehicle position reveal that the vehicle is close to a road segment along which a significant number of previous driver in-alertness situations have been monitored.

The geo-tagged driver behavior data parameters indicating characteristics of driver behavior associated with the road segment, for a plurality of vehicles having previously been driven along the road segment, may comprise one or more of, for instance, a parameter indicating a number of monitored driver behaviors with a high level of in-alertness, a parameter indicating a number of monitored driver behaviors with a medium level of in-alertness, and/or a parameter indicating a number of monitored driver behaviors with a low level of in-alertness, etc.

Correspondingly, the predetermined monotonous road criteria may comprise one or more of, for instance, a preference such as a threshold for a number of monitored driver behaviors with a high level of in-alertness, a preference for a number of monitored driver behaviors with a medium level of in-alertness, and/or a preference for a number of monitored driver behaviors with a low level of in-alertness, etc.

According to yet another embodiment, the road segment determining system may further initiate an activity adapted to avoid the situation with the potentially in-alert driver of the vehicle and/or adapted to improve the alertness of the driver. Thereby, a measure may be triggered to counteract said situation. That is, "initiating an activity" may for instance be represented by triggering a selection of, or a recommendation for the driver to choose, an alternative route, to thereby avoid said situation with the potentially in-alert driver. Additionally or alternatively, "initiating an activity" may be represented by triggering a function, such as a warning, to improve said alertness of the driver. Furthermore, in order to improve the alertness of the driver, "initiating an activity" may be represented by postponing e.g., an incoming phone call and/or email such that said phone call and/or email becomes available to the driver when the he or she approaches or reaches the monotonous road section. Moreover, "initiating an activity", may be represented by recommending restaurants, and/or fuel stations, and/or even providing advertising signs, etc. along the monotonous road section, to thereby improve said alertness of the driver.

The word "initiating" may for instance refer to "triggering", "starting", "making available", "providing" and/or "providing access to", whereas the word "activity" for instance may refer to "function", "measure" and/or "counteraction".

According to a further embodiment, the activity may comprise a software-based function adapted to cognitively stimulate the driver, such as a software-based alertness task application. Thereby, a mind-stimulating activity is triggered to increase, or preventively maintain, the alertness of the driver. That is, by stimulating the mind of the driver, and/or engaging the driver in intellectual thinking or interaction, the alertness of the driver may be increased. Thus, a monotonous road segment, which subsequently may imply a potential decrement in driver performance, may be counteracted through mind-stimulation of the driver, i.e., by stimulating the driver in such a way that he or she is not distracted from driving safely. Accordingly, by initiating a software-based function adapted to cognitively stimulate the driver, the driver may be prevented from becoming in-alert, in a manner which may not even be perceived by the driver as an activity triggered to avoid a situation of him or her potentially becoming in-alert. By initiating said function rather than merely triggering a warning, which may be ignored or be perceived as intrusive by the driver, the driver is invited to participate in a mind-stimulating activity, which is likely to be welcomed stimuli. Accordingly, triggering the mind-stimulating activity represents a sophisticated solution to avoiding a situation of the driver potentially being in-alert, as compared to merely alerting the driver by means of e.g., an audible warning, such as a warning signal and/or message, a visual warning, such as displayed graphic warning and/or message, and/or a tactile warning, such as a vibration of the steering wheel and/or driver seat.

The expression of the software-based function being "adapted to cognitively stimulate the driver" may refer to the software-based function being mind-stimulating for the driver, and/or the software-based function engaging the driver in intellectual thinking or interaction. Furthermore, said function may refer to a function which is mind-stimulating on a level at which the alertness of the driver is increased, or preventively maintained, rather than a function distracting the driver from his or her main task of driving the vehicle.

Moreover, the expression "software-based function" may refer to a function, functionality and/or an application embedded in one or more of an arbitrary node comprised in the vehicle, such as an electronic control unit (ECU), and/or embedded in one or more of an arbitrary electronic portable device, which may adapted to be in communication with the vehicle. The "portable device" may refer to an information, communication or entertainment device that can be brought into the vehicle by the vehicle occupant, e.g., the driver, with the intention to be used e.g., while driving. The "portable device" may hence refer to, for instance, a multi-functional smart phone, mobile phone, mobile terminal or wireless terminal, portable computer such as a laptop, PDA or tablet computer, surf plate such as an iPad, Pocket PC, mobile navigation device, iPod, and/or DVD player. The portable device may be represented by the user device discussed above. The disposition of the functionality between the vehicle and optional portable device, may be arbitrarily selected as suitable for the situation at hand. According to an example, the software-based function is comprised in the road segment determining system. According to another example, at least a portion of the software-based function is provided by means of a plug-in solution, for instance by being provided on a dongle. In that manner, an aftermarket solution may be supported.

Furthermore, the software-based function adapted to cognitively stimulate the driver, may refer to a function which provide audible cognitive stimulation e.g., via one or more of a loudspeaker; for instance audible presentation of an audiobook, a riddle, information associated with the current region through which the vehicle is traveling, or a user manual of the vehicle, etc. Additionally or alternatively, the software-based function adapted to cognitively stimulate the driver, may refer to a function which provide visual cognitive stimulation e.g., via one or more of a display; for instance visual presentation of a riddle or information associated with the current region through which the vehicle is traveling, etc.

Moreover, the software-based function adapted to cognitively stimulate the driver may refer to a function which invites or prompts the driver to interact therewith, for instance via one or more of a touch display, a microphone, and/or steering wheel control buttons. Said function may accordingly be represented by, for instance, a tutorial associated with use of the vehicle.

Furthermore, since the road segment determining system may be adapted to be in radio communication with a radio communications network, the software-based function may be represented by a function which may utilize on-line functionality, or which for instance may be adapted to suit the current vehicle position.

In the scenario of the software-based function comprising an alertness task application, such as an alertness game application, the function is cognitively stimulating to the driver in that the alertness task application invites the driver to participate in an alertness task. The alertness task application may relate to any task or game cognitively stimulating the driver, such as, for instance, a task or game inviting the driver to do mental arithmetic, do riddles, sing, take a quiz, or count number of oncoming vehicles having license plates containing a specific letter or number, or a task or game questioning the driver on previously passed surroundings, etc. The alertness task application, e.g., an alertness game application, may for instance be represented by a user application program provided in the road segment determining system, the in-vehicle system, and/or the portable device.

According to exemplifying embodiments, the function may be associated with an in-vehicle system of the vehicle. Thereby, the in-vehicle system is, to some extent, involved in the provision of said function. That is, at least a portion of the software-based function may reside in, be available through, be provided by, presented by means of, and/or be interactable via, the in-vehicle system.

The "in-vehicle system", which may also be referred to as a built-in vehicle system, native in-vehicle control system or vehicle infotainment system, may refer to hardware/software products and systems which are permanently or temporarily built into, or can be added to the vehicle, in order to enhance the vehicle occupant experience when it comes to providing audio and visual entertainment, as well as automotive navigation systems. Accordingly, the in-vehicle system may comprise resources adapted for functionality control of the in-vehicle system, such as microphones, speakers, input/control devices such as physical push buttons, rocker buttons, dials, slider switches, sticks, and/or a touchpad. The in-vehicle system may further comprise one or several displays, such as touch sensitive displays, commonly utilized to display e.g., graphic, video, digital images, animations and text, and further utilized to display e.g., virtual buttons, menus, and other user-interface objects to thereby provide a user interface through which a vehicle occupant, for instance the driver, may interact with the in-vehicle system. Accordingly, the resources of the in-vehicle system, such as the microphone(s), loudspeaker(s), input/control devices and/or display(s), may be utilized to provide the software-based function, and/or utilized to enable the driver to interact with the software-based function.

Additionally or alternatively, according to other exemplifying embodiments, the function may be associated with the portable device. Thereby, the portable device is, to some extent, involved in the provision of said function. That is, at least a portion of the software-based function may reside in, be available through, be provided by, presented by means of, and/or be interactable via, the portable device. Thereby, the function may be provided by means of the portable device, as a complement to, or instead of, being provided by means of e.g., an in-vehicle system.

The "portable device" may comprise resources adapted for functionality control thereof, such as microphone(s), speaker(s), input/control devices such as physical push buttons, rocker buttons, dials, slider switches, sticks, and/or a touchpad. The portable device may further comprise one or several displays, such as touch sensitive displays, commonly utilized to display e.g., graphic, video, digital images, animations and text, and further utilized to display e.g., virtual buttons, menus, and other user-interface objects to thereby provide a user interface through which a vehicle occupant, for instance the driver, may interact with the portable device. Accordingly, the resources of the portable device, such as the microphone(s), loudspeaker(s), input/control devices and/or display(s), may be utilized to provide the software-based function, and/or utilized to enable the driver to interact with the software-based function.

A previously discussed, the portable device may be represented by a nomadic device, i.e., be paired with the vehicle. Commonly, the nomadic device may include various user application programs, e.g., either integrated into an operating system of the nomadic device, and/or stored in a memory thereof and executable by a processor thereof. Thus, user application programs may be hosted and run on the nomadic device while the e.g., driver may interact with one or several of the user application programs through the in-vehicle system. Moreover, while the nomadic device is paired, the resources of the in-vehicle system may be utilized, such as e.g., microphones, speakers, displays and/or in-vehicle buttons for interacting with a selected user application program running on the nomadic device. Accordingly, in the scenario of at least a portion of the software-based function being comprised in the nomadic device, the resources of the in-vehicle system, such as the microphone(s), loudspeaker(s), input/control devices and/or display(s) of the in-vehicle system, and/or the resources of the nomadic device, such as the microphone(s), loudspeaker(s), input/control devices and/or display(s) of the nomadic device, may be utilized to provide the software-based function, and/or utilized to enable the driver to interact with the software-based function.

The disposition of the function, and the ability to interact therewith, between the in-vehicle system and the portable device, e.g., a nomadic device, may depend on the character and/or functionality of the function, the in-vehicle system and/or the portable device.

Additionally or alternatively, according to yet a further embodiment, the activity may comprise a function considered to be driver-distracting and which is prohibited from use during absence of the determination that the road segment is monotonous. Thereby, upon determining that the road segment is considered monotonous, a function deemed to be too driver-distracting during ordinary conditions, i.e., when it has not been determined that the road segment is monotonous, may go from being blocked from use to be made available in order to avoid a situation with a potentially in-alert driver. That is, the function according to this embodiment is a function deemed to be driver-distracting and un-available to the driver when it has not been determined that the road segment is monotonous. However, upon determining that the road segment is considered monotonous, the same function may be deemed to be driver-stimulating rather than driver-distracting, in that it enables for avoiding a situation with a potentially in-alert driver. The word "driver-distracting" may likewise refer to "interfering with the driver's focus on driving the vehicle", whereas "prohibited" likewise may refer to "blocked" and/or "unavailable".

Said driver-distracting function may for instance refer to in-vehicle functionality which is blocked from use when it has not been determined that the road segment is monotonous; for instance, certain infotainment, entertainment and/or navigation features. For instance, the driver-distracting function may relate to texting, placing a phone call, scrolling through menus, entering input into the navigation system etc., all of which during "ordinary" conditions may be unavailable functionality to the driver, for instance when driving the vehicle at more than e.g., 10 km/h.

It should be appreciated that the introduced methods in the road segment determining system may require the vehicle, the user device and/or the portable device, to be in a respective "ON" state.

According to a second aspect of embodiments herein, the object is achieved by a road segment determining system adapted for identifying beforehand a situation with a potentially in-alert driver of a vehicle. The road segment determining system comprises a position determining unit adapted for determining a position of the vehicle. The road segment determining system further comprises a characteristics determining unit adapted for determining pre-stored road characteristics of a road segment assumed or known to be ahead of the vehicle. Moreover, the road segment determining system comprises a monotonous road determining unit adapted for determining the road segment to be monotonous based on comparing at least a first road parameter of the pre-stored road characteristics with predetermined monotonous road criteria.

According to an embodiment, the pre-stored road characteristics may be available prior to the vehicle being in the vicinity of the road segment.

According to another embodiment, the pre-stored road characteristics may comprise map data, such as digital map data of the road segment.

According to a further embodiment, the pre-stored road characteristics may comprise digital map data parameters indicating characteristics of the road segment which potentially affect the alertness of the driver.

Additionally or alternatively, the pre-stored road characteristics may comprise geo-tagged driver behavior data of the road segment.

According to a further embodiment, the pre-stored road characteristics may comprise geo-tagged driver behavior data parameters indicating characteristics of driver behavior associated with the road segment, for a plurality of vehicles having previously been driven along the road segment.

According to one embodiment, the road segment determining system may further comprise an initiating unit adapted for initiating an activity adapted to avoid the situation with the potentially in-alert driver of the vehicle and/or adapted to improve the alertness of the driver.

According to a further embodiment, the activity may comprise a software-based function adapted to cognitively stimulate the driver, such as a software-based alertness task application.

Additionally or alternatively, the activity may comprise a function considered to be driver-distracting and which is prohibited from use during absence of the determination that the road segment is monotonous.

Similar advantages as those mentioned in the foregoing in relation to the first aspect correspondingly apply to the second aspect, why these advantages are not further discussed.

According to a third aspect of embodiments herein, the object is achieved by a vehicle comprising at least a portion of the road segment determining system discussed above. Yet again, similar advantages as those mentioned in the foregoing in relation to the first aspect correspondingly apply to the third aspect, why these advantages are not further discussed.

According to a fourth aspect of embodiments herein, the object is achieved by a user device comprising at least a portion of the road segment determining system discussed above. Once more, similar advantages as those mentioned in the foregoing in relation to the first aspect correspondingly apply to the fourth aspect, why these advantages are not further discussed.

According to a fifth aspect of embodiments herein, the object is achieved by a computer program product comprising a computer program containing computer program code means arranged to cause a computer or a processor to execute the steps of the methods of the road segment determining system discussed above, stored on a computer-readable medium or a carrier wave. Yet again, similar advantages as those mentioned in the foregoing in relation to the first aspect correspondingly apply to the fifth aspect, why these advantages are not further discussed.

BRIEF DESCRIPTION OF THE DRAWINGS

The various aspects of non-limiting embodiments according to the disclosure, including particular features and advantages, will be readily understood from the following detailed description and the accompanying drawings, in which.

DETAILED DESCRIPTION

Figure 1:
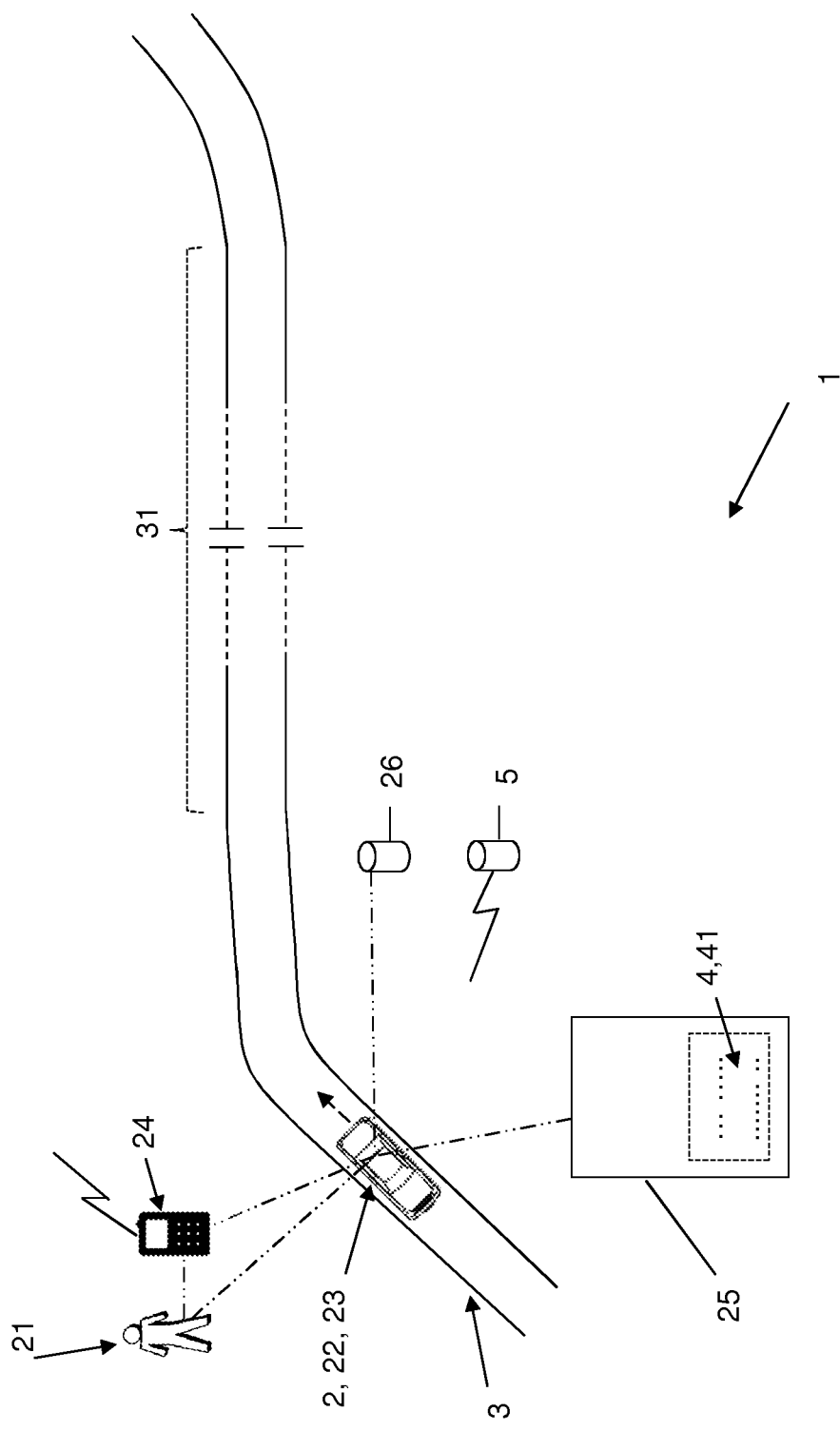
FIG. 1 illustrates a schematic overview of an exemplifying road segment determining system at least partly comprised in a vehicle and/or at least partly comprised in a user device, according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional. Furthermore, the figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the following, according to embodiments herein which relate to identifying beforehand a situation with a potentially in-alert driver of a vehicle, there will be disclosed that by identifying an upcoming monotonous road segment in advance, a potentially hazardous driver situation may be identified before it may be bound to occur, i.e., prior to the vehicle reaching the road segment.

Referring now to the figures and FIG. 1 in particular, there is depicted a schematic overview of an exemplifying road segment determining system 1 at least partly comprised in a vehicle 2 and/or at least partly comprised in a user device 24, according to embodiments of the disclosure. The road segment determining system 1, which will be described in further detail later on, is adapted for identifying beforehand a situation with a potentially in-alert driver 21 of the vehicle 2.

The illustrated vehicle 2 is in the shown embodiment a car, situated at an arbitrary position 22. The vehicle 2 comprises an optional in-vehicle system 23. The optional user device 24 is adapted to communicate with the vehicle 2. Here the user device 24 is a mobile user device, e.g., a smartphone, paired with the in-vehicle system 23 of the vehicle, thus representing a nomadic device.

The vehicle 2 travels along an arbitrary road 3, i.e., any surface along which the vehicle 2 may travel The road 3 comprises a road segment 31 assumed or known to be ahead of the vehicle 2. The vehicle 2 is assumed to not yet be in the vicinity of the road segment 31. The road segment 31 is here a relatively lengthy, essentially straight, road section with a non-changing speed limit, without curves or intersections.

Moreover, the vehicle 2 of the shown embodiment comprises one or more of a display 25, e.g., comprised in the in-vehicle system 23; additionally or alternatively, the display 25 may be comprised in the user device 24. Shown on said display 25 is an activity 4. The activity 4 of the exemplifying embodiment of FIG. 1 comprises a software-based function adapted to cognitively stimulate the driver 21. In the shown embodiment, the software-based function is represented by a software-based alertness task application 41. Optionally, the activity 4 may comprise a function considered to be driver-distracting and which is prohibited from use during ordinary circumstances. The software-based alertness task application 41 and the optional driver-distracting function will be described in further detail later on in this description.

Furthermore, depicted in the exemplifying embodiment of FIG. 1 is an optional map data database 26, here located within the vehicle 2, and an optional geo-tagged driver behavior data database 5, here located remote from the vehicle 2 and wirelessly accessible by the vehicle 2 and/or the user device 24. The map data database 26 and the geo-tagged driver behavior data database 5 will be described in further detail below.

Figure 2:
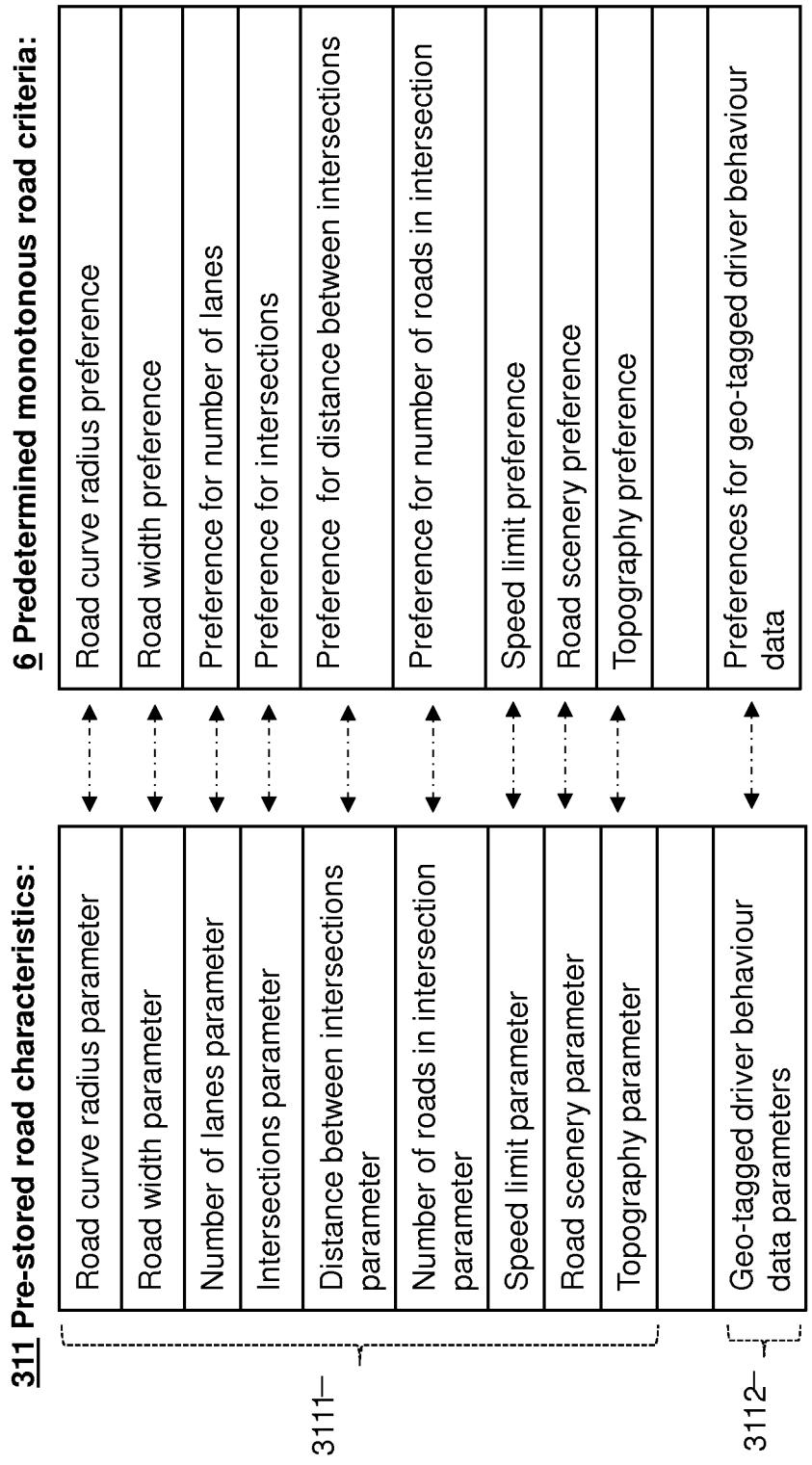
FIG. 2 illustrates exemplifying pre-stored road characteristics and exemplifying predetermined monotonous road criteria, according to embodiments of the disclosure.

FIG. 2 illustrates exemplifying pre-stored road characteristics 311 and exemplifying predetermined monotonous road criteria 6, according to embodiments of the disclosure. The pre-stored road characteristics 311 are here represented by road characteristics of the road segment 31 assumed or known to be ahead of the vehicle 2, as illustrated in FIG. 1.

The exemplifying pre-stored road characteristics 311 may comprise digital map data of the road segment 31. The map data may, for instance, be retrievable from the map data database 26.

Furthermore, the pre-stored road characteristics 311 may comprise digital map data parameters 3111 indicating characteristics of the road segment 31 which potentially may affect the alertness of the driver 21. Said digital map data parameters 3111 may comprise one or more of, for instance, a road curve radius parameter, a road width parameter, a number of lanes parameter, an intersections parameter, a distance between intersections parameter, a number of roads in intersection parameter, a speed limit parameter, a road scenery parameter, a topography parameter, etc.

Correspondingly, predetermined monotonous road criteria 6 may comprise one or more of, for instance, a road curve radius preference, a road width preference, a number of lanes preference, a preference for intersections, a preference for distance between intersections, a preference for number of roads in intersection, a speed limit preference, a road scenery preference, a topography preference, etc.

Additionally or alternatively, the exemplifying road characteristics 311 may comprise geo-tagged driver behavior data of the road segment 31. The geo-tagged driver behavior data may, for instance, be retrievable from the geo-tagged driver behavior data database 5.

Furthermore, the exemplifying road characteristics 311 may comprise geo-tagged driver behavior data parameters 3112 indicating characteristics of driver behavior associated with the road segment 31, for a plurality of vehicles having previously been driven along the road segment 31. Said geo-tagged driver behavior data parameters 3112 may comprise one or more of, for instance, a parameter indicating a number of monitored driver behaviors with a high level of in-alertness, a parameter indicating a number of monitored driver behaviors with a medium level of in-alertness, and/or a parameter indicating a number of monitored driver behaviors registered with a low level of in-alertness, etc.

Correspondingly, the predetermined monotonous road criteria 6 may comprise one or more of, for instance, preferences for geo-tagged driver behavior data, for instance a preference such as a threshold for a number of monitored driver behaviors with a high level of in-alertness, a preference for a number of monitored driver behaviors with a medium level of in-alertness, and/or a preference for a number of monitored driver behaviors with a low level of in-alertness, etc.

Figure 3:
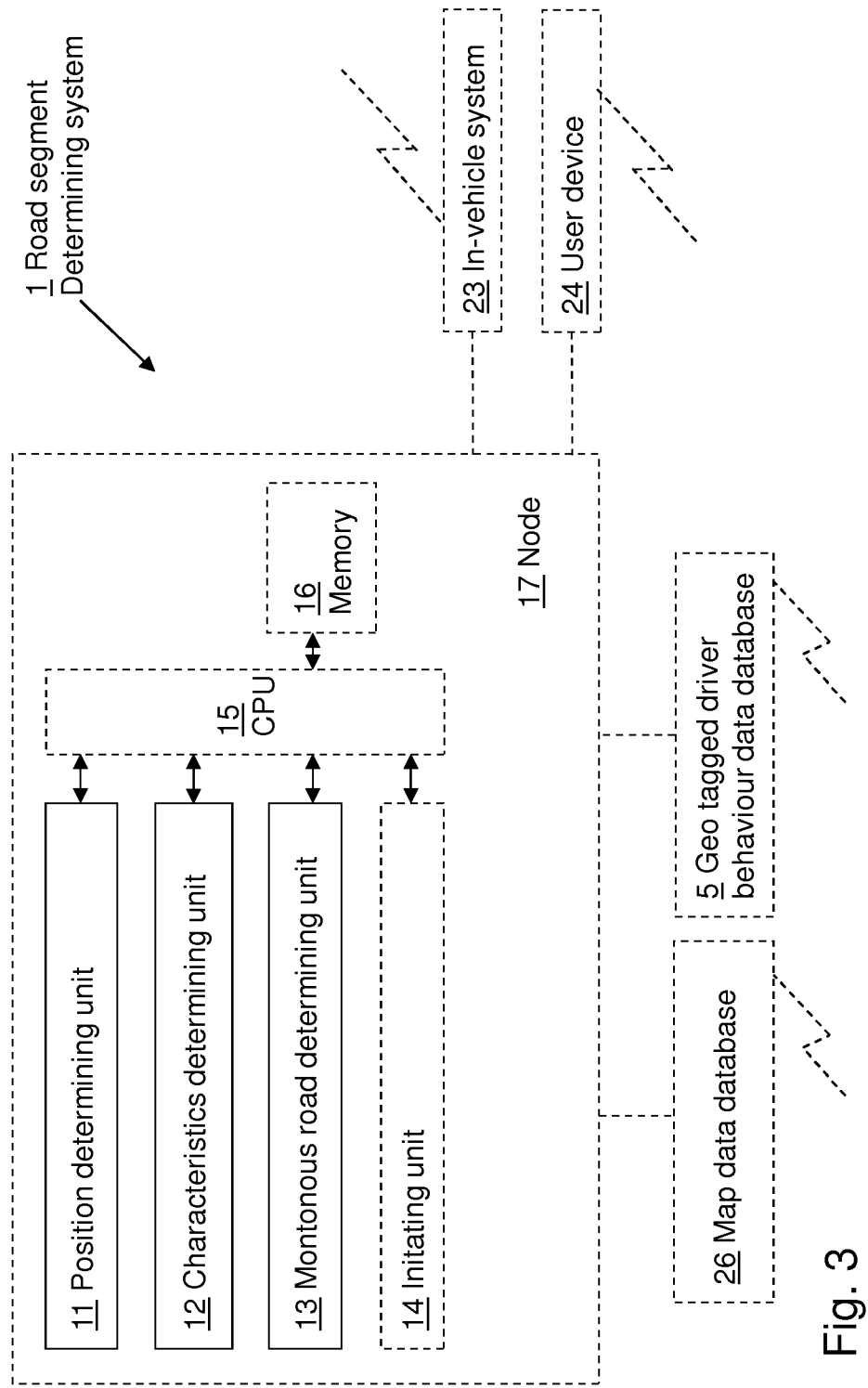
FIG. 3 is a schematic block diagram illustrating an exemplifying road segment determining system according to embodiments of the disclosure.

As further shown in FIG. 3, which depicts a schematic block diagram illustrating an exemplifying road segment determining system 1 according to embodiments of the disclosure, the road segment determining system 1 is, as previously mentioned, adapted for identifying beforehand a situation with a potentially in-alert driver 21 of the vehicle 2. The road segment determining system 1 comprises a position determining unit 11, a characteristics determining unit 12 and a monotonous road determining unit 13. The road segment determining system 1 may further comprise an initiating unit 14. Moreover, the embodiments herein for identifying beforehand a situation with a potentially in-alert driver 21 of the vehicle 2, may be implemented through one or more processors, such as a processor 15, here denoted CPU, together with computer program code for performing the functions and actions of the embodiments herein. Said program code may also be provided as a computer program product, for instance in the form of a data carrier carrying computer program code for performing the embodiments herein when being loaded into the road segment determining system 1. One such carrier may be in the form of a CD ROM disc. It is however feasible with other data carriers such as a memory stick. The computer program code may furthermore be provided as pure program code on a server and downloaded to the road segment determining system 1.

The road segment determining system 1 may further comprise a memory 16 comprising one or more memory units. The memory 16 may be arranged to be used to store e.g., information, and further to store data, configurations, schedulings, and applications, and for instance road characteristics, digital map data, geo-tagged driver behavior data, digital map data parameters, geo-tagged driver behavior data parameters, and temporary position data, to perform the methods herein when being executed in the road segment determining system 1. Furthermore, the position determining unit 11, the characteristics determining unit 12, the monotonous road determining unit 13, the optional initiating unit 14, the optional processor 15 and/or the optional memory 16, may at least partly, be implemented in one or several arbitrary nodes 17 of the vehicle 2. A node 17 may e.g., be an electronic control unit (ECU), such as an infotainment node and/or a main central node, or any suitable generic electronic device comprised in the vehicle 2. According to an alternative example, the node 17 may, rather than being represented by one or several integrated ECUs, be represented by a plug-in solution, for instance a dongle. In that manner, an aftermarket solution may be provided to any arbitrary vehicle suitable.

Additionally or alternatively, the position determining unit 11, the characteristics determining unit 12, the monotonous road determining unit 13, the optional initiating unit 14, the optional processor 15 and/or the optional memory 16 may, at least partly, be implemented in the user device 24. The disposition of the functionality between the user device 24 and node(s) 17 may be arbitrary selected as considered suitable.

Those skilled in the art will also appreciate that the position determining unit 11, the characteristics determining unit 12, the monotonous road determining unit 13, and the optional initiating unit 14 described above, and which will be described in more detail later on in this description, may refer to a combination of analog and digital circuits, and/or one or more processors configured with software and/or firmware, e.g., stored in a memory such as the memory 16, that when executed by the one or more processors such as the processor 15 perform as will be described in more detail later on. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Figure 4:
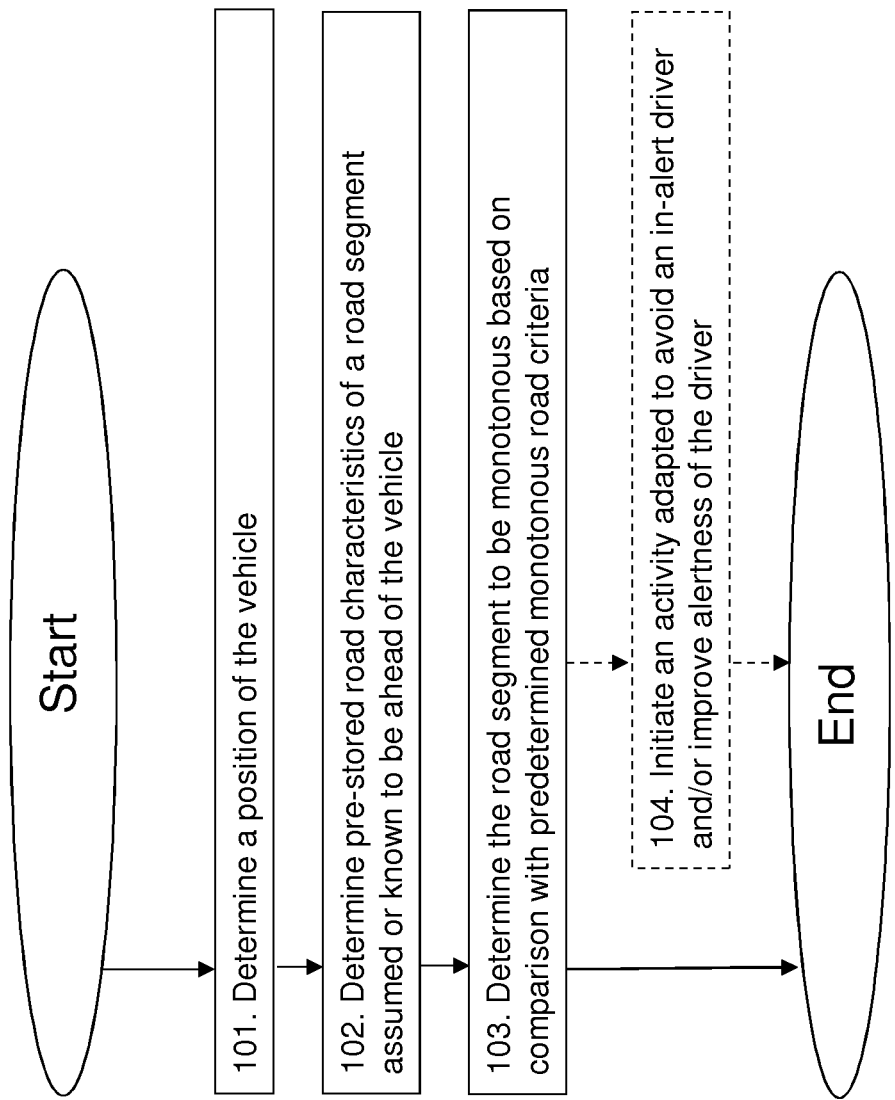
FIG. 4 is a flowchart depicting an exemplifying method performed by a road segment determining system according to embodiments of the disclosure.

FIG. 4 is a flowchart depicting an exemplifying method performed by a road segment determining system 1 according to embodiments of the disclosure. The method in the road segment determining system 1 is for identifying beforehand a situation with a potentially in-alert driver 21 of a vehicle 2. The exemplifying method, which may be continuously repeated, comprises the following actions discussed with support from FIGS. 1-3.

Action 101

In Action 101, the road segment determining system 1 determines, for instance by means of the position determining unit 11, the position 22 of the vehicle 2.

Correspondingly, the position determining unit 11 is adapted for determining the position 22 of the vehicle 2.

Determining the position 22 of the vehicle 2 may be achieved in any commonly known manner, and may for instance refer to GPS positioning and/or cellular positioning, e.g., accomplished by means of a navigation system and/or the user device 24 on-board the vehicle 2. The position 22 of the vehicle 2 may thus, according to some embodiments, be represented by the position of the mobile user device 24.

Action 102

In Action 102, the road segment determining system 1 determines, for instance by means of the characteristics determining unit 12, the pre-stored road characteristics 311 of the road segment 31 assumed or known to be ahead of the vehicle 2.

Correspondingly, the characteristics determining unit 12 is adapted for determining the pre-stored road characteristics 311 of the road segment 31 assumed or known to be ahead of the vehicle 2.

Thereby, road characteristics 311 which are associated with the upcoming road segment 31 and which are available prior to the vehicle 2 approaching or reaching said road segment 31, are accessed. The road characteristics 311 being "pre-stored" may refer to the road characteristics 311 being stored prior to the vehicle 2 approaching or reaching the road segment 31. The road characteristics 31 may be stored in, for instance, the map data database 26 and/or the geo-tagged driver behavior data database 5.

The pre-stored road characteristics 311 may be available prior to the vehicle 2 being in the vicinity of the road segment 31. Thereby, by the road characteristics 311 of the road segment 31 being accessible even before the vehicle 2 is relatively close to said road segment 31, a monotonous road segment may be identified irrespective of how far away the vehicle 2 is from the road segment 31.

Furthermore, the pre-stored road characteristics 311 may comprise the digital map data of the road segment 31. Thereby, the road segment determining system 1 may determine the road characteristics 311 by accessing said digital map data.

Moreover, the pre-stored road characteristics 311 may comprise the digital map data parameters 3111 indicating characteristics of the road segment 31 which potentially affect the alertness of the driver 21. Thereby, parameters 3111 considered relevant in terms of potential hazardous driving are utilized to judge whether or not an upcoming road section 31 should be considered to be monotonous.

Additionally or alternatively, the pre-stored road characteristics 311 may comprise the geo-tagged driver behavior data of the road segment 31. Thereby, the road characteristics 311 comprise driver behavior data associated with said road segment 31, for instance driver alertness along said road segment 31. Accordingly, previous driver behavior associated with the road segment 31, may be taken into account to judge whether or not the upcoming road segment 31 should be considered to be monotonous.

Moreover, the pre-stored road characteristics 311 may comprise the geo-tagged driver behavior data parameters 3112 indicating characteristics of driver behavior associated with the road segment 31, for a plurality of vehicles having previously been driven along the road segment 31. Thereby, data parameters 3112 revealing numerous previous driving experiences along the road segment 31 may be taken into consideration in judging whether or not an upcoming road section 31 should be considered to be monotonous.

Action 103

In Action 103, the road segment determining system 1 determines, for instance by means of the monotonous road determining unit 13, that the road segment 31 is monotonous based on comparing at least a first road parameter of the pre-stored road characteristics 311 with the predetermined monotonous road criteria 6.

Correspondingly, the monotonous road determining unit 13 is adapted for determining that the road segment 31 is monotonous based on comparing at least a first road parameter of the pre-stored road characteristics 311 with the predetermined monotonous road criteria 6.

Thereby, by comparing at least a first road parameter 3111 of the pre-stored road characteristics 311, e.g., at least a road curve radius parameter, with predetermined monotonous road criteria 6, e.g., a road curve radius preference, the road segment determining system 1 may determine that if the e.g., road curve radius is larger than a predetermined road curve radius threshold, the road segment 31 is considered to be monotonous. Accordingly, by comparing the pre-stored road characteristics 311 with the predetermined monotonous road criteria 6, it may be determined whether or not said road section 31 assumed or known to be ahead of the vehicle 2, is considered monotonous, prior to the vehicle 2 approaching or reaching said road section 31.

Consequently, according to the approach described in the foregoing, i.e., by comparing the pre-stored road characteristics 311 with the predetermined monotonous road criteria 6, it may be determined whether or not said road section 31 assumed or known to be ahead of the vehicle 2, is considered monotonous, prior to the vehicle 2 approaching or reaching said road section 31. Thereby, since a monotonous road segment 31 may imply a situation with a potentially in-alert driver 21, for instance that the alertness of the driver 21 may decrease, a potentially hazardous driver situation may be identified before it may be bound to occur, i.e., prior to the vehicle 2 reaching said road section 31.

Action 104

In optional Action 104, the road segment determining system 1 may initiate, for instance by means of the initiating unit 14, the activity 4. The activity 4 may be adapted to avoid the situation with the potentially in-alert driver 21 of the vehicle 2; additionally or alternatively, the activity 4 may be adapted to improve the alertness of the driver 21.

Correspondingly, the initiating unit 14 may be adapted for initiating the activity 4. The activity 4 may be adapted to avoid the situation with the potentially in-alert driver 21 of the vehicle 2; additionally or alternatively, the activity 4 may be adapted to improve the alertness of the driver 21.

Thereby, a measure may be triggered to counteract said situation.

Optionally, the activity 4 may comprise a software-based function adapted to cognitively stimulate the driver 21, such as the software-based alertness task application 41. Thereby, a mind-stimulating activity 4 may be triggered to increase, or preventively maintain, the alertness of the driver 21. The expression "software-based function" may refer to a function, functionality and/or an application embedded in one or more of the arbitrary node 17 comprised in the vehicle 2, such as an electronic control unit (ECU), and/or embedded in one or more of an arbitrary electronic portable device. The portable device is here represented by the user device 24.

In the scenario of the function comprising the alertness task application 41, such as an alertness game application, the function is cognitively stimulating to the driver 21 in that the alertness task application invites the driver 21 to participate in an alertness task. The alertness task application 41 may for instance be represented by a user application program available in the road segment determining system 1, the in-vehicle system 23 and/or the portable device 24.

According to exemplifying embodiments, the software-based function may be associated with the in-vehicle system 23 of the vehicle 2. Thereby, the in-vehicle system 23 is, to some extent, involved in the provision of said function. That is, at least a portion of the software-based function may reside in, be available through, be provided by, presented by means of, and/or be interactable via, the in-vehicle system 23. Additionally or alternatively, according to other exemplifying embodiments, the software-based function may be associated with the portable device, here the user device 24. Thereby, the portable device 24 is, to some extent, involved in the provision of said function. That is, at least a portion of the software-based function may reside in, be available through, be provided by, presented by means of, and/or be interactable via, the portable device 24. Thereby, the function may be provided by means of the portable device 24, as a complement to, or instead of, being provided by means of e.g., the in-vehicle system 23.

The activity 4 may comprise a function considered to be driver-distracting and which is prohibited from use during absence of Action 103 of the determination that the road segment 31 is monotonous. Thereby, upon determining that the road segment 31 is considered monotonous, a function deemed to be too driver-distracting during ordinary conditions, i.e., when it has not been determined that the road segment 31 is monotonous, may go from being blocked from use to be made available in order to avoid a situation with a potentially in-alert driver 21. Said driver-distracting function may for instance refer to in-vehicle functionality which is blocked from use when it has not been determined that the road segment 31 is monotonous; for instance, certain infotainment, entertainment and/or navigation features. For instance, the driver-distracting function may relate to texting, placing a phone call, scrolling through menus, entering input into the navigation system, etc., all of which during "ordinary" conditions may be unavailable functionality to the driver 21, for instance when driving the vehicle 2 at a speed of more than e.g., 10 km/h.

The person skilled in the art realizes that the present disclosure by no means is limited to the embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Furthermore, the features of various implementing embodiments may be combined to form further embodiments of the invention. Additionally, in the claims, the word "comprising" does not exclude other elements or steps, and the indefinite article "a" or "an" does not exclude a plurality.

What is claimed is:

1. A method performed by a road segment determining system for identifying beforehand a situation with a potentially in-alert driver of a vehicle, the method comprising:
   determining a position of the vehicle;
   determining pre-stored road characteristics of a road segment assumed or known to be ahead of the vehicle, wherein the pre-stored road characteristics comprise geo-tagged driver behavior data parameters that indicate characteristics of driver behavior associated with the road segment for a plurality of vehicles having previously been driven along the road segment; and
   determining whether or not the road segment is monotonous based on comparing at least a first geo-tagged driver behavior data parameter of the pre-stored road characteristics with predetermined monotonous road criteria comprising preferences for geo-tagged driver behavior data, the predetermined monotonous road criteria referring to preferences making up the criteria for under what circumstances a road section is considered to be monotonous.

2. The method according to claim 1 wherein the pre-stored road characteristics are available prior to the vehicle being in a vicinity of the road segment.

3. The method according to claim 1 wherein the pre-stored road characteristics comprise:
   digital map data of the road segment.

4. The method according to claim 3 wherein the pre-stored road characteristics comprise:
   digital map data parameters indicating characteristics of the road segment which potentially affect alertness of the driver.

5. The method according to claim 1 further comprising:
   initiating, by the road segment determining system, an activity adapted to avoid the situation with the potentially in-alert driver of the vehicle and/or adapted to improve alertness of the driver, if it is determined that the road segment is monotonous.

6. The method according to claim 5 wherein the activity comprises:
   a software-based function adapted to cognitively stimulate the driver, wherein the software-based function includes executable instructions stored on a non-transitory medium; and/or a function considered to be driver-distracting and which is prohibited from use during absence of the determination that the road segment is monotonous.

7. The method according to claim 5 wherein the activity comprises a software-based alertness task application including executable instructions stored on a non-transitory medium.

8. A road segment determining system adapted for identifying beforehand a situation with a potentially in-alert driver of a vehicle, the road segment determining system comprising:
a position determining unit adapted for determining a position of the vehicle;
a characteristics determining unit adapted for determining pre-stored road characteristics of a road segment assumed or known to be ahead of the vehicle, wherein the pre-stored road characteristics comprise geo-tagged driver behavior data parameters that indicate characteristics of driver behavior associated with the road segment for a plurality of vehicles having previously been driven along the road segment; and
a monotonous road determining unit adapted for determining whether or not the road segment is monotonous based on comparing at least a first geo-tagged driver behavior data parameter of the pre-stored road characteristics with predetermined monotonous road criteria comprising preferences for geo-tagged driver behavior data, the predetermined monotonous road criteria referring to preferences making up the criteria for under what circumstances a road section is considered to be monotonous.

9. The road segment determining system according to claim 8 wherein the pre-stored road characteristics are available prior to the vehicle being in a vicinity of the road segment.

10. The road segment determining system according to claim 8 wherein the pre-stored road characteristics comprise:
digital map data of the road segment.

11. The road segment determining system according to claim 10 wherein the pre-stored road characteristics comprise:
digital map data parameters indicating characteristics of the road segment which potentially affect alertness of the driver.

12. The road segment determining system according to claim 8 further comprising:
an initiating unit adapted for initiating an activity adapted to avoid the situation with the potentially in-alert driver of the vehicle and/or adapted to improve alertness of the driver, if it is determined that the road segment is monotonous.

13. The road segment determining system according to claim 12 wherein the activity comprises:
a software-based function adapted to cognitively stimulate the driver, wherein the software-based function includes executable instructions stored on a non-transitory medium; and/or
a function considered to be driver-distracting and which is prohibited from use during absence of the determination that the road segment is monotonous.

14. The road segment determining system according to claim 12 wherein the activity comprises a software-based alertness task application including executable instructions stored on a non-transitory medium.

15. A vehicle comprising the road segment determining system according to claim 8.

16. A user device comprising the road segment determining system according to claim 8.

17. A computer program product comprising a computer program including computer program code stored on a non-transitory computer-readable medium for execution by a computer or a processor to:
determine a position of a vehicle;
determine pre-stored road characteristics of a road segment assumed or known to be ahead of the vehicle, wherein the pre-stored road characteristics comprise geo-tagged driver behavior data parameters that indicate characteristics of driver behavior associated with the road segment for a plurality of vehicles having previously been driven along the road segment; and
determine whether or not the road segment is monotonous based on comparing at least a first geo-tagged driver behavior data parameter of the pre-stored road characteristics with predetermined monotonous road criteria comprising preferences for geo-tagged driver behavior data, the predetermined monotonous road criteria referring to preferences making up the criteria for under what circumstances a road section is considered to be monotonous;
whereby a situation with a potentially in-alert driver of a vehicle may be identified beforehand.

18. The method according to claim 1 wherein the geo-tagged driver behavior data parameters comprise one or more of a parameter indicating a number of monitored driver behaviors with a high level of in-alertness, a parameter indicating a number of monitored driver behaviors with a medium level of in-alertness, or a parameter indicating a number of monitored driver behaviors with a low level of in-alertness.

19. The method according to claim 18 wherein the predetermined monotonous road criteria comprise one or more of a threshold for a number of monitored driver behaviors with a high level of in-alertness, a threshold for a number of monitored driver behaviors with a medium level of in-alertness, or a threshold for a number of monitored driver behaviors with a low level of in-alertness.

* * * * *